United States Patent Office 3,185,598
Patented May 25, 1965

3,185,598
SOLDERING FLUX
Joseph F. Quaas, Island Park, N.Y., and Daniel D. Zielik, Fairfield, Conn., assignors to Eutectic Welding Alloys Corporation, Flushing, N.Y., a corporation of New York
No Drawing. Filed Sept. 5, 1961, Ser. No. 135,733
3 Claims. (Cl. 148—26)

This invention relates to a soldering flux of the reaction type, and it more particularly relates to such a flux which is particularly effective for soldering cast iron.

Solder is prevalently applied to cast iron for filling defects, holes and cracks in the walls of vessels and for joining brass or copper tubing to cast iron bodies such as gear cases, headers and cylinder blocks. However, the consummation of a firm bond between solder and cast iron is highly complicated by the difficulty of wetting the graphite particles which permeate cast iron. It has therefore heretofore been necessary to rub solder alloys, which are mushy over a broad temperature range, into cast iron in order to achieve any sort of bond. This rubbing in of solder requires a great deal of skill and experience, and even under the best conditions does not provide as dependable a bond as might be desired. This has made the art of applying solder to cast iron very difficult and expensive to perform. Furthermore, it has been necessary to use nickel or nickel-iron alloys to provide adequate solder bonding between copper and cast iron.

An object of this invention is to provide a flux which facilitates soldering to cast iron;

Another object is to provide such a flux which makes it possible to use most any type of solder for cast iron.

A further object is to provide such a flux which makes it possible to consummate extremely strong bonds with cast iron.

In accordance with this invention a remarkably effective soldering flux incorporatets the following ranges of constituents in percentages by weight:

| Constituent | Proportional range | Preferred example |
| --- | --- | --- |
| Heavy metal oxidizing agent | 1.5 to 7.5 | 5.0 |
| Heavy metal chlorides and bromides | 10.0 to 20.0 | 15.0 |
| Cupric chloride | 10.0 to 35.0 | 22.0 |
| Ammonium chloride and ammonium hydrogen fluoride | 26.5 to 73.0 | 58.0 |
| | | 100.0 |

The heavy metal oxidizing agent is of the type which releases its oxygen at temperatures ranging approximately from 300 to 1000° F., and their residues must be compatible with a strong bond between the solder and parent metals. Particularly effective heavy metal oxidizing agents are oxides of lead, iron, manganese, tungsten and uranium of the formulae indicated in the following list. These oxidizing agents release their oxygen at relatively low temperatures, for example, from 300 to 1000° F. thereby making a flux including them operative with practically any type of useful solder. The following list of oxides is representative of the type of heavy metal oxidizing agent which is operative in this invention:

These oxidizing agents apparently react with the nodules or flakes of unwettable graphite in the cast iron to for $CO_2$ and $CO$ which eliminates the graphitic form of carbon upon the surface of the cast iron to increase the wettability of the treated surfaces.

The heavy metal chlorides and bromides and the chlorides of ammonium ($NH_4Cl$) provide low melting point vehicles upon combination wherein the resultant melting point of the flux is made compatible with the melting point of the filler type alloy solder employed. These components therefore act as a solution or carrier having a melting point within the temperatures normally realized during solder heating processes. Effective heavy metal chlorides and bromides in this formulation are, for example, chlorides and bromides analogous to the above listed heavy metal listed oxides. Particularly effective chlorides and bromides in this formulation are, for example, those of gallium, lead, tungsten and iron.

The copper chloride in its cupric form acts as a tinning agent through an electromotive displacement reaction with the parent metal which exchanges metallic copper for iron. This substitution of copper molecules for the iron molecules upon the surface of the cast iron provides a surface which is more conducive to retention of the applied solder.

The ammonium fluoride is of the acid type (i.e., ammonium hydrogen fluoride), and it decomposes upon application of heat to provide soluble metallic fluorides which react and combine with the metal oxides deposited upon the surface of the parent metal and also the oxides which are formed during the heating period. This constituent therefore takes the oxides into solution and prevents them from interfering with the wetting of the parent metal by the solder. This eliminates wetting resistant oxide substance which similarly to graphite would interfere with wetting of the parent metal by the solder.

This composition therefore provides a reaction type soldering flux which remarkably promotes wetting and diffusion of almost any type of solder into cast iron. It completely eliminates the troublesome and inefficient rubbing process which was heretofore required to apply solder to a cast iron surface and the special type of broad mushy temperature range solder, having for example a considerable tin content, which the rubbing process necessitates. This flux composition improves the wettability of cast iron surfaces to such an extent that any type of solder type alloy may be effectively applied, including even lead type solders.

The solder alloys applied in the presence of this flux may be utilized in either solid form such as wire or flat shims or even in mesh form which may be conveniently intermixed with the flux formulation to provide a combined solder and flux, which is remarkably simple and effective to apply. This powdered flux composition can be mixed with liquid vehicles such as water or organic liquid vehicles such as alcohol, glycerine and various types of oils, to provide a convenient flux paste composition.

What is claimed is:
1. A soldering flux consisting essentially of the follow-

*Heavy metal oxidizing agents*

| | | | | | | | | | |
| --- | --- | --- | --- | --- | --- | --- | --- | --- | --- |
| | $Ga_2O$ $Ga_2O_3$ | $InO$ $In_2O_3$ | $Ti_2O$ $Ti_2O_3$ | $ZnO$ | $CdO$ | $Cu_2O$ $CuO$ | $PbO$ $Pb_2O_3$ $Pb_3O_4$ $PbO_2$ | $TiO$ | $MnO$ $Mn_2O_3$ $Mn_3O_4$ $MnO_2$ |
| $FeO$ $Fe_2O_3$ $Fe_3O_4$ | $NiO$ | $CoO$ $Co_2O_3$ $Co_3O_4$ | $GeO$ | $SnO$ | $VO$ $V_2O_3$ $VO_2$ | $Mo_2O_3$ $MoO_2$ | $WO_2$ | $UO_2$ | $CrO$ $Cr_2O_3$ | ing composition in the indicated proportional ranges of percentages by weight:

| Constituent: | Proportional range |
|---|---|
| Heavy metal oxidizing agent | 1.5 to 7.5 |
| Heavy metal chlorides and bromides | 10.0 to 20.0 |
| Cupric chloride | 10.0 to 35.0 |
| Ammonium chloride and ammonium hydrogen fluoride | 26.5 to 73.0 | said heavy metal oxidizing agents being of the type which release their oxygen at temperatures ranging approximately from 300 to 1000° F. with residues compatible with a strong bond between a solder and parent metal.

2. A flux as set forth in claim 1 wherein the heavy metal of said heavy metal chlorides and bromides is selected from the group consisting of gallium, lead, tungsten and iron.

3. A flux as set forth in claim 1 wherein said heavy metal oxidizing agents are selected from the group consisiting of lead, iron, manganese, tungsten and uranium oxides.

References Cited by the Examiner

UNITED STATES PATENTS

| 1,216,933 | 2/17 | Bosch et al. | 252—441 |
| 1,625,926 | 4/27 | Woodruff et al. | 252—441 |
| 1,960,239 | 5/34 | Callis et al. | 148—26 |
| 2,028,348 | 1/36 | Pier et al. | 252—441 |

DAVID L. RECK, *Primary Examiner.*

RAY K. WINDHAM, WINSTON A. DOUGLAS, *Examiners.*